(12) United States Patent
Sanchez (10) Patent No.: US 7,291,311 B2
(45) Date of Patent: Nov. 6, 2007

(54) PROCESS FOR CONTROLLING A MOVING BED COMBUSTION ZONE AND ITS USE

(75) Inventor: Eric Sanchez, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 369 days.

(21) Appl. No.: 10/640,578

(22) Filed: Aug. 14, 2003

(65) Prior Publication Data

US 2005/0074369 A1    Apr. 7, 2005

Related U.S. Application Data

(63) Continuation-in-part of application No. 10/388,769, filed on Mar. 17, 2003, now abandoned.

(30) Foreign Application Priority Data

Mar. 15, 2002  (FR) .................................. 02 03210

(51) Int. Cl.
 *B01J 19/00* (2006.01)
(52) U.S. Cl. ........................... 422/111; 422/62; 436/55; 502/37; 502/38; 502/45; 502/46; 502/48; 502/52; 585/324; 208/64; 208/136; 208/DIG. 1
(58) Field of Classification Search .................. 208/64, 208/136, DIG. 1; 422/62, 111; 436/55; 502/37, 38, 45, 46, 48, 52; 585/324
See application file for complete search history.

(56) References Cited

U.S. PATENT DOCUMENTS

| 3,033,780 | A | * | 5/1962 | McGrath et al. ............ 208/136 |
| 4,981,575 | A | * | 1/1991 | De Bonneville ............. 208/64 |
| 6,103,652 | A | * | 8/2000 | Brunet et al. .................. 502/37 |
| 6,133,183 | A | * | 10/2000 | Capelle et al. ................. 502/37 |
| 6,239,055 | B1 | * | 5/2001 | Brunet et al. .................. 502/45 |
| 6,566,569 | B1 | * | 5/2003 | Chen et al. .................. 585/324 |

* cited by examiner

*Primary Examiner*—Glenn Caldarola
*Assistant Examiner*—Prem C. Singh
(74) *Attorney, Agent, or Firm*—Millen, White, Zelano & Branigan, P.C.

(57) ABSTRACT

Process for controlling the combustion zone of a fluidized bed process comprising a regeneration zone and a reaction zone, the catalyst circulating between these two zones, and the regeneration zone comprising a combustion stage of the coke deposited on the catalyst in the reaction zone, control of the combustion zone being performed on the basis of a characteristic variable of the operation of said combustion zone, said characteristic variable being the object of automatic regulation by acting on the catalyst throughput, characterized in that the value of the catalyst throughput or of any control variable connected unequivocally to the catalyst is determined based on information on the operating values of the combustion zone, at least one of which corresponds to an independent evaluation of the level of coke deposited on the catalyst.

23 Claims, 2 Drawing Sheets

PROCESS FOR CONTROLLING A MOVING BED COMBUSTION ZONE AND ITS USE

CROSS REFERENCE TO RELATED APPLICATION

This is a continuation-in-part of application Ser. No. 10/388,769 filed Mar. 17, 2003 now abandoned.

This invention relates to all moving bed processes for hydrocarbon conversion and more specifically regenerative catalytic reforming, which can be translated as reforming process with continuous regeneration of the catalyst. More generally, this invention is suitable for application in any process requiring a regeneration of the catalyst used, said regeneration comprising at least one combustion stage of the coke deposited on the catalyst and said catalyst having cycle times between a half day and 15 days. Cycle time is understood as precisely the time at the end of which the catalyst needs to be regenerated to recover its catalytic activity.

The object of this invention is to improve the operation of the catalyst circulation in this type of unit to make the function of the regeneration zone more stable and safer, and also to improve the overall performances of the unit which, by better anticipating deviations, will be able to function with a lower average amount of coke deposited on the catalyst.

About one quarter of the reforming units operating in the world use moving bed technology that appeared in the 1970s. But other processes can use or already use this technology. Besides so-called Aromizing® processes (production of aromatic hydrocarbons) or Octanizing® processes (production of hydrocarbons with a high octane number), the process of metathesis, the process of production of isoparaffins from n-paraffins and the various dehydrogenations of paraffins with cyclic compounds can be mentioned. This moving bed technology is characterized by continuous circulation of the catalyst between the various reactors from the reaction zone then from the reaction zone toward the regeneration zone. A complete description of this type of unit will be found, for example, in the work "Le Raffinage du Petrole" [The Refining of Petroleum]/volume 3, by P. Leprince published by TECHNIP pages 159-163. As a basis in the rest of the text, we will consider regenerative reforming as representative of moving bed units, but the invention in fact applies to any process using this technology and having a regeneration zone comprising at least one combustion stage for the coke deposited on the catalyst during the reaction stage.

A regenerative reforming unit comprises numerous reactors placed in series and comprising among each of these reactors one intermediate reheating furnace to bring the load at the top of each of the reactors to a determined level, generally between 450° C. and 550° C. The connection between the last reactor of the reaction zone and the regeneration zone is generally provided by a pneumatic transport element using an approximately vertical duct in which the catalyst circulates, ascending, at high speeds on the order of 1 to 5 m/s. This vertical duct, called "lift," is the object of control by pressure differential, as will be described below. The control of the throughput of the circulating catalyst is generally based on a measurement of the head loss between two points of the lift. There is indeed an unequivocal correlation, for a given unit, between the head loss taken between two points of the lift and the throughput of the circulating catalyst, since this head loss is essentially due to the gravimetric load of solid contained in the lift (or average concentration of solid inside the lift), to the acceleration of the solid, and to friction of the gas-solid suspension against the walls of the lift. Over the range of throughput variation generally found in these units, and considering the constant speed of the catalyst in the lift imposed by design, it can be considered that there is linearity between the head loss and the catalyst throughput, which means that any increase or decrease in the head loss or pressure difference (which is also sometimes called delta P in the following text) will translate into a proportional increase or decrease in the catalyst throughput.

Numerous devices for controlling the circulation of the catalyst have been developed in different patents. U.S. Pat. No. 5,500,110 can be cited, which describes a method of controlling the transport of particles between two zones by comparing a calculated value of the head loss between the two zones to a measured value. This method does not use any measurement of coke deposited on the solid. The method described in this patent has as its principal object the reduction of throughput fluctuations.

U.S. Pat. No. 5,338,440 describes a method of transporting solid particles between a first zone containing a first fluid and a second zone containing a second fluid while avoiding contact between the first and second fluid. This method also does not use a measurement of coke deposited on the solid.

U.S. Pat. No. 5,716,516 describes a method of transporting particles using pneumatic transport elements and other elements using gravity transport and using a combination of nonmechanical valves so as to reduce the attrition of these particles. No information on coke content of these particles is used in the method described.

French patent 97/04 661 describes a method of controlling and regulating the combustion zone of a reforming unit using knowledge of the position of the flame front. But this method does not include a means of evaluating the level of coke deposited on the catalyst.

This invention, perfectly compatible with the method of flame front detection developed in French patent 97/04 661, describes a new method for controlling the circulation of the catalyst by relying on the principal operating parameters of the regeneration zone, for example the level of coke deposited on the catalyst. Another aspect of this invention is to include means that make it possible to analyze the consistency of the principal operating variables and thus to alert the operator of any deviation of the measuring instruments, notably the oxygen analyzers, before an operating incident can occur. Such a control thus makes it possible to make the functioning of the regenerator safe by anticipating deviations in the functioning of the instrumentation. Further, this new control also defines an optimized recalibration frequency for the instruments and no longer variable, as in the prior art. This optimization of maintenance also contributes to maintaining reliable instrumentation and brings with it a supplemental guarantee against any deviation of the instruments or erroneous operating indication liable to lead to a degradation of the catalyst and/or of the equipment inside the regenerator.

The operator in charge of this type of unit thus guides the circulation of the catalyst by imposing increments on the pressure differential at the level of the lift, generally daily, sometimes at greater frequency, depending on the progress of the regeneration, on the severity of operation of the reactive section, and on an estimate of the catalyst throughput obtained by calculating the frequency of at which a flooding chamber fills. This mode of operation will be called the conventional mode in the rest of the text. This flooding chamber is a volume placed in the catalyst circuit, generally branched from the main circuit, and into which is diverted all or part of the catalyst throughput during a given time. Knowing the volume of this flooding chamber, it is therefore possible to deduce from it an estimate of the throughput of the catalyst circulating in the unit. An hourly frequency of estimation is currently practiced in industry. On this basis, it is easily conceivable that the level of coke deposited on the catalyst varies depending on the severity of the operating conditions, but also depending on a possible lack of anticipation by various operators.

It is one of the points that this invention makes it possible to resolve more specifically. The lack of anticipation of operating conditions in the combustion zone can in fact lead to a deviation in the deposit of coke on the catalyst which, in certain cases, can result in a decrease in the severity of operation (lower load throughput and/or octane number) or, lacking a reaction by the operator, and if the deviation is greater, in immobilization of the regeneration zone following an operating incident. Outside these extreme cases, most often, a lack of anticipation generally leads to operating the unit at a higher level of coke, thus higher operating temperatures, leading ultimately to less economical operation.

In fact, a difference in the coke level of more than 1% by weight leads, with an iso-compound load, to the following differences. It is a matter of estimates whose only purpose is to solidly establish the orders of magnitude.
Operating temperature: base temperature+2° C.
Hydrogen yield: base hydrogen yield+0.03% by weight
C5+ Yield: Base C5+ yield−0.15% by weight.

Further, this invention will lead to having a more stable end of combustion zone in the regnerator. Because of this, protection of equipment and of the catalyst will be greatly improved because the new automatic control device developed in this invention eliminates all risk of exothermicity in the zone downstream from the combustion zone where the oxygen concentration is greater.

The impossibility of exothermicity in the zone downstream from the combustion zone results directly from control of the limit of end of combustion and from the possibility of determining the consistency of the operating measurements in the regeneration zone. The consistency of the O2 and thermal balances, which is one aspect of this invention, will be examined later in the text.

The catalyst for regenerative reforming units is available in the form of globules of an average diameter between 1 and 4 millimeters, these globules consisting of a support made of aluminized silica on which particles or a group of particles (often called crystallites) containing one or more noble metals, generally at least platinum, have been deposited. Good dispersion of these crystallite on the surface of the support is an essential condition for catalyst activity.

Catalyst regeneration in reforming units is a complex operation that is performed in several stages, generally a first stage of combustion that makes it possible to burn the coke deposited on the surface of the catalyst, followed by a stage of oxychloration/calcination, which retransforms the platinum crystallites into precursors, redistributes them on the surface of the support and prepares the reduction stage. After a stage of reduction in the presence of hydrogen, which makes it possible to eliminate the oxygen or chlorine atoms introduced in the oxychloration stage, the catalyst recovers its initial activity. The problems posed by this succession of stages, which constitute catalyst regeneration, essentially relate to control of the temperature during the combustion phase to prevent any reduction of the specific surface area of the support and progression toward platinum crystallites of a size that afterward makes it very difficult to redisperse or redistribute them in the oxychloration phase. Coke combustion, especially if its concentration on the catalyst is high in places, can indeed lead to hot spots, for example temperatures higher than 700° C., even in certain cases higher than 1,000° C., which can irreversibly degrade the aluminum support. The latter then loses part of its surface, thus part of its activity, but even more, its mechanical strength is diminished, which can lead to fragmentation in the form of very fine particles, which harm the proper functioning of the catalytic bed. Further, these high temperatures can irreversibly damage the internal parts of the regenerator. A description of catalyst regeneration used in reforming gasoline or in the production of aromatic hydrocarbons will be found in patent EP-A-0 378 482.

The object of the new control concept developed in this invention is to make it possible to more safely operate the regeneration zone by regulating a characteristic variable, representative of the proper functioning of the said zone, by acting on the circulation of the catalyst or on any value that is unequivocally connected to catalyst throughput. The coke combustion stage will be continuously analyzed by an automatic control of the main operating variables of said zone. In short, the control and regulation concept proposed in this invention makes it possible for said zone to function more safely. This safe functioning is obtained by continuous verification of the consistency of the measurements of the main parameters governing catalyst regeneration, notably estimates of the coke content, and by anticipation of operating deviations resulting from possible changes in the operation of the reactive section. Control of the catalyst throughput entering the regeneration zone based on reliable information (validated by the new concept of data consistency that is an integral part of the invention), such as for example the coke content deposited on the catalyst, thus makes it possible to guarantee that the temperature in the combustion zone will stay within certain limits. The combustion zones, generally two of them, operate at a pressure of 3 to 8 bars, about equal to that which prevails in the first reforming reactor, and at a temperature between 350° C. and 550° C., preferably between 420 and 518° C., by means of a combustion gas based on an inert gas containing 0.01 to 1% oxygen, preferably 0.6 to 0.8% by volume.

According to the prior art, control of the circulation of the catalyst is based on only the head loss measurement taken between two points on the master lift line, which will be called simply lift in the rest of the text, knowing that for a given unit there is an unequivocal correlation between the head loss taken between two points of the lift and the throughput of the circulating catalyst. By introducing continuous and consistent evaluation of the main operating parameters, such as for example the level of coke deposited on the catalyst, by means of an automatic calculation and in real time, it will be possible automatically to adjust the circulation of the catalyst to maintain either a constant burning capacity for the regenerator or a constant amount of coke on the catalyst, or more generally, a characteristic variable that represents the proper functioning of the regeneration zone.

Control of catalyst circulation by constant burning capacity makes it possible to maintain not only the level of coke on the catalyst but to maintain the quantity of coke burned in the regenerator, which is the surest guarantee of stable operation of the regenerator. Indeed, the limit of end of combustion is not a direct function of the level of coke of the catalyst, but is a function of the mass throughput of coke to be burned, i.e., of the product of the level of coke deposited on the catalyst times the throughput of the circulating catalyst. The regenerator zone is operated on a continuous basis with a stream of high coke level catalyst being introduced into the regenerator zone. This induces a net coke input into the regeneration zone (because the catalyst output toward reaction zone is a stream of low coke level catalyst). This net coke input is counterbalanced by the coke combustion inside the regeneration zone. Accordingly, the level of coke on the catalyst is substantially constant.

The range of variation of the burning capacity is a function of the design and flexibility of the unit. This control means is to be envisioned for severe operating conditions.

Control of the catalyst circulation at a constant coke level makes it possible to guarantee the best performances and thus maximum efficiency of the unit. Indeed, the lower the coke level on the catalyst, the lower the operating temperature with "isoperformance", and the higher the yield of valuable products. The term "isoperformance", in reforming processes, means that the performance of the installation is the same, with respect to the quality of the final products and especially to the production of hydrocarbons with a high octane number. However, any unit is limited in its burning capacity because of thermal stability and dwell time in the various zones of the regenerator. The constant mode of regulation of the coke level, when it is possible, is thus to be envisioned for optimum economy. For this invention, no matter the type of regulation selected (constant coke level of constant burning capacity), the operator will be alerted to all functioning of the regenerator near its maximum or minimum limits and to any lack of consistency among the main operating variables.

It is further suitable to note that this invention does not eliminate the use of correlation between the head loss (or more generally any variable unequivocally connected to catalyst throughput) and the throughput of the circulating catalyst. The control method developed in this invention continues to be based on such a correlation to be able to act on the catalyst throughput by the intermediary of head loss, but the signaling of new values of head loss, or of any other variable unequivocally correlated with the catalyst throughput, instead of being left to the initiative of the operator, is now provided by an automatic calculation and in real time of the level of coke deposited on the catalyst, a calculation that is itself based on various operating parameters governing catalyst regeneration, such as oxygen concentrations and operating temperatures. It is on these points that this invention offers completely decisive progress compared to the prior art.

Figure 2:
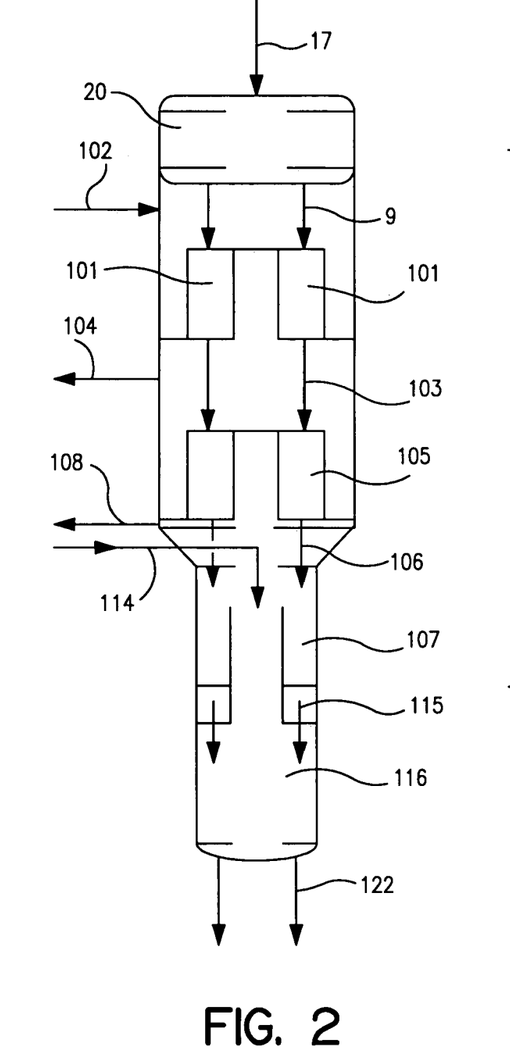
FIG. 2 is a typical representation of the regeneration zone in a regenerative moving bed process.

To facilitate comprehension of the invention, reference is made to a description of the regeneration zone given by FIG. 2. In this figure which represents most units, the passage of the catalyst between the various zones, and particularly from the oxychloration zone to the calcination zone, is achieved by descending legs (conduits, channels, or ducts) (9; 103; 106; 115). In certain recent units, these legs do not exist, which does not at all change the characteristics of the invention, which is not tied to a particular technology of the regeneration zone but applies to any moving bed regeneration comprising at least one combustion stage. The catalyst to be regenerated is carried by the lift line and is introduced into the regeneration enclosure by a line (17) where it is deposited in a storage zone (20), integral or not with the regeneration enclosure. It then passes through legs (9) into a first combustion zone (101) and through legs (103) into a second combustion zone (105). A gas containing oxygen, generally air, is introduced by conduits (102) and (104) and the combustion effluents leave combustion zone (105) by a line (108). By legs (106), the catalyst passes into an oxychloration zone (107) fed by a chlorinated gas (114) then the catalyst passes into a calcination zone (116) through legs (115). The effluents from the oxychloration zone leave the regeneration zone by a line (122).

The invention thus consists of a method (which will also be called a process) for controlling the combustion zone for a moving bed process comprising a regeneration zone and a reaction zone, the regeneration zone comprising a combustion stage for the coke deposited on the catalyst in the reaction zone and the control of said combustion zone being performed based on a characteristic variable representative of the operation of said combustion zone, said characteristic variable being the object of automatic regulation by action on the catalyst throughput, characterized in that the value of the catalyst throughput or of any command variable connected unequivocally with the catalyst throughput, generally delta P of the lift, is determined based on information on the operating values in the combustion zone, at least one of which corresponds to an evaluation of the level of coke deposited on the catalyst.

Characteristic variable, representative of the operation of the combustion zone, is understood as any variable characterizing proper functioning of said zone. For example, it can involve the position of the flame front in the combustion zone, such as it is described in the rest of the text. It can also involve a variable such as the level of coke deposited on the catalyst at the entrance to the regeneration zone. It can also involve the coke throughput entering the regeneration zone (also called burning capacity), which is expressed as the product of the circulating catalyst throughputs times the level of coke deposited on the catalyst at the entrance to the combustion zone. Command variable is understood as either the catalyst throughput itself or a variable that is tied to it unequivocally such as, for example, the delta P taken between two points on the lift, of which it was previously explained that it is directly correlated, for a given unit, with the catalyst throughput. Operating values of the combustion zone are understood as all the variables used to analyze the functioning of the combustion zone such as the various throughputs of injected air, the temperatures taken at different percentage points of the bed, the pressure level, etc.

In most cases, more than one data percentage points will be available concerning the level of coke deposited on the catalyst. On a regenerative reforming unit, for example, there are usually at least four independent evaluations of the coke level. The estimate of the level of coke deposited on the catalyst is performed through balances on the oxygen used for the combustion stages, these balances being made on each combustion bed (generally two in number, but possibly more) or on a group or on all the beds, and through one or several thermal balances relating to the combustion zone or the regeneration unit. The number of these balances will be able to change over time and according to the units, taking into account the evolution of plans of the regeneration section of the catalyst. In its principle, the invention can use any number of balances, it being understood that they are the object of a consistency test of the value of the coke level making it possible to provide a reliable value for the latter.

The various evaluations of the coke level deposited on the catalyst are compared among themselves so that the difference between all of these values taken two by two is less than 0.5 percentage points, preferably less than 0.2 percentage points and still more preferably less than 0.1 percentage points, the automatic control of the combustion zone is performed based on a set percentage points determined based on the average value of the various values of the coke level. A percentage point is an absolute value. For example, the difference between coke levels of 5.5% and 5.4% is 0.1 percentage points. If the various evaluations of the level of coke deposited on the catalyst are compared among themselves so that the difference between any two of these values is greater than 0.5 percentage points, preferably greater than 0.2 percentage points, still while being less than 0.7 percentage points, the unit operator is alerted to an anomaly and the control mode of the combustion zone automatically switches to manual regulation mode. Finally, if the various evaluations of the level of coke deposited on the catalyst are compared among themselves so that the difference between any two of these values is greater than 0.7 percentage points, particularly greater than 1 percentage points, an automatic stop to the circulation of the catalyst is triggered. Among the various possible evaluations of the level of coke deposited on the catalyst, a frequent situation corresponds to the case where at least three independent balances are performed on the oxygen at different percentage points in the combustion zone, and at least one thermal balance is performed on the combustion zone in its entirety. One of the independent evaluations of the level of coke deposited on the catalyst will be able to be obtained by a direct measurement performed according to ASTM standard D 3178, based on taking a sample of the circulating catalyst, taken just upstream from the regeneration zone.

Automatic control of the combustion zone will be able to be performed with the object of keeping the level of coke deposited on the catalyst at an approximately constant value, i.e., at its set percentage points value plus or minus 0.5 percentage points, and preferably at plus or minus 0.2 percentage points. Automatic control of the combustion zone will also be able to be performed with the object of keeping the burning capacity, i.e., the product of the catalyst throughput times the coke level, at an approximately constant value, i.e., at its set percentage points value plus or minus 5 Kg/h, and preferably plus or minus 2 Kg/h.

The coke level is expressed in percentage by mass with respect to the catalyst throughput. For example, if the average value of the coke level is 5%, it will be considered that the values are consistent if they are between 4.7% and 5.3%. These calculations, performed continuously, are compared among themselves and an average value of the coke level is deduced from this, which will make it possible to readjust the set percentage points of the command variable acting on the catalyst throughput. If the difference among the various calculated values of the coke level is less, for example, than 0.3 percentage points (the word percentage points is used in the sense of the same unit as the average value), the average value of the coke level will be used automatically to correct the catalyst throughput, either to keep the burning capacity constant (mode 1), or to keep the coke level constant (mode 2), or more generally to keep a characteristic variable that represents the proper functioning of the regeneration zone at an approximately constant value. In the following text, two preferred embodiments of the invention will be presented, designating, as characteristic variable, the burning capacity of the regenerator or coke regulation mode using constant burning capacity signifies that what is being sought is to keep the coke throughput entering the regeneration zone at an approximately constant value, i.e., at its set percentage points value in Kg/h (or target value) plus or minus 5 Kg/h, and preferably plus or minus about 2 Kg/h.

The regulation mode using constant coke level signifies that what is being sought is to keep the coke level at its set percentage points value (or target value) plus or minus about 0.3 percentage points and preferably plus or minus about 0.2 percentage points, the coke level being evaluated at the entrance to the regeneration zone.

If the difference between the various calculated values of the coke level is greater, for example, than 0.5 percentage points, preferably 0.2 percentage points, still while being less than 0.7 percentage points, the control of the circulation of the catalyst will automatically return to the so-called conventional mode, i.e., correlated only to the head loss value between two percentage points of the lift, so that the value of the head loss taken into account is at a first time, the last measured value of this head loss. Simultaneously, a problem indication will be communicated to the operator informing him of a lack of homogeneity and consistency in the main instruments in the regeneration loop of the catalyst, and asking hm, for example, to perform a recalibration of various sensors and analyzers in the regeneration loop. If the difference between two of the various values of the estimate of the coke level is higher than 1 percentage point, preferably higher than 0.7 percentage points, an automatic stop of the circulation of the catalyst will be triggered, no matter the position of the flame front. In fact it involves a situation considered to be serious, requiring stoppage of the unit before any investigation into the cause or corrective action.

Figure 3:
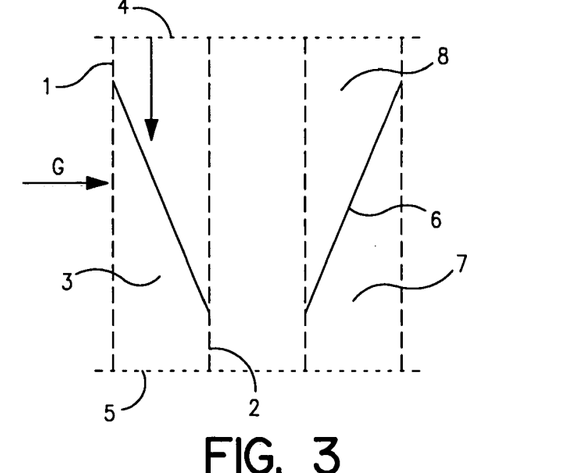
FIG. 3 is a simplified representation of the temperature profile that becomes established in one of the beds of the combustion zone that contains the regeneration zone.

Other situations can appear after estimation of the average coke level of the catalyst, for example, the maximum or minimum burning capacity of the regenerator can be surpassed, or even the maximum admissible coke level can also be surpassed or even the position of the flame front can be located too close to the physical limit of the end of the combustion zone. To facilitate comprehension of this percentage point, it is necessary to return to FIG. 3, which represents in lengthwise section a combustion zone with ring-shaped bed (3), delimited by two coaxial, cylindrical walls, an external wall (1), and an internal wall (2). Through the external wall, a grate according to FIG. 3, a gas G enters and it contains oxygen that passes through moving catalyst bed (3) with descending flow from the entrance into combustion zone (4) to the exit of this zone (5). The combustion zone thus has height h consisting of the distance separating the levels of entrance (4) and exit (5) of said zone. A flame front (6) develops in the combustion zone, i.e., an approximately linear partition line that separates, in front of this front, a zone (7) inside which the catalyst is no longer coked, and a zone (8), behind the front, inside which the catalyst is coked and undergoes the combustion reaction. It was determined that, to guarantee that practically all the coke is burned, the lowest percentage point of the flame front, corresponding to the end of combustion, had to be located sufficiently inside the combustion zone. More specifically, to assure real control of the position of the flame front, it is necessary to allow a certain flexibility in the position of the lowest point of the flame front, which must generally be located at a height less than 98% of the total height of the combustion zone, and preferably at a height between 70 and 80% of the total height of this combustion zone as defined above. The heights of the flame front are arbitrarily calculated starting at entry level (4) into the combustion zone.

Regardless of the type of control selected, constant coke level or constant burning capacity, when the catalyst circulation is too close to the maximum or minimum burning capacity of the regenerator, or if the flame front is too close to the previously defined limit, or the dwell time is too short in the zones downstream from the combustion zone, control will automatically switch to conventional mode (mode 3). Automatic control according to this invention will be returned to operation at the operator's initiative, when one or several of the preceding criteria will have returned to normal values. To facilitate this return to automatic control, an indication of return to normal will be communicated to the operator, who will then again be able to run the unit according to the concept of this invention by selecting the constant coke level mode (mode 2) or constant burning capacity mode (mode 1) or any other regulation mode using a characteristic variable that represents the proper functioning of the combustion zone.

In the various malfunction situations enumerated above, the switch to conventional mode will be made automatically and will last until the operator judges that a normal situation has been reestablished, based on which he will reactivate mode 1 or mode 2.

Figure 1:
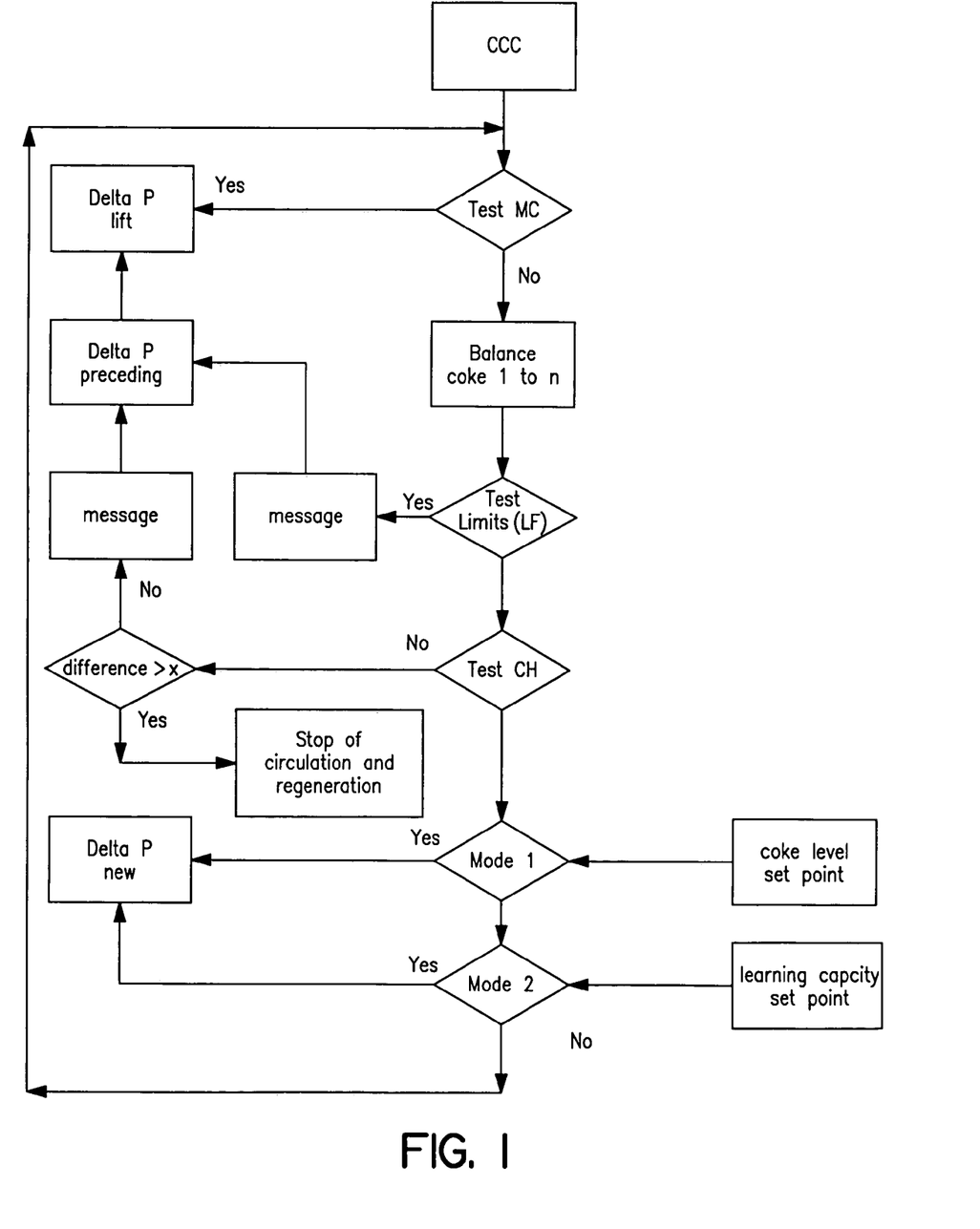
FIG. 1 is a representation of a flowchart for control and regulation that is the object of this invention.

More precisely, the logic of this new control mode will be better understood by following the calculation flowchart of FIG. 1, which represents two preferred embodiments of the invention depending on if burning capacity (designated CB on FIG. 1) or coke level (designated NC on FIG. 1) is selected as the target value. It is also perfectly possible to change the regulation mode during the operation of the unit.

In this flowchart the following can be seen:

the set point or the target values, which are either a coke value called coke target (mode 2) or a target burning capacity (mode 1)

parameters defining limiting values (designated "test LF" in FIG. 1) relating to the design or to the operating stability, maxi/mini burning capacity, maxi/mini DP lift measured or calculated parameters, which are:

head loss value measured between two points of the lift (delta P lift)

the coke level, calculated based on a first balance of oxygen performed on the first bed of the combustion zone (coke 1)

the coke level calculated based on a second balance of oxygen performed on the second bed of the combustion zone (coke 2)

the coke level calculated based on a third balance of oxygen, this balance being performed on the entire combustion zone (coke 3)

the level of coke calculated based on a thermal balance performed on the entire combustion zone (coke 4)

the coke level determined based on a sampling of catalyst and on a laboratory measurement (lab coke)

a positioning of the flame front at the level of the first combustion bed, determined by display according to the method laid open in detail in French patent 97/04 661.

The evaluation of the various coke levels (coke 1; coke 2; coke 3; coke 4) is performed according to the following formulas:

$$coke1 = (Air1 + Air2)*(K1 - O2in)*(K2/Mcata)$$

$$coke2 = (Mgascomb*(O2in - O2out) + Air2(K1 - O2out))*K2/Mcata$$

$$coke3 = (Air2 + Air1)*(1 - K3*O2out)*(K2/Mcata)$$

$$coke4 = (Qlosses + Mcata*Cpcata*(Tcatout - Tcatin) + Mgascombout*Cpgasout*Tgasout - (Mgascombin*Cpgasin*Tgasin + Air2*Cpair*Tair))*K4/Mcata*\Delta Hreaction$$

In these various formulas, the designation of the various parameters is the following:

Air1 is the mass throughput of air introduced at the level of the first bed of the combustion zone Air2 is the mass throughput of air introduced at the level of the second bed of the combustion zone Mcata is the mass throughput of circulating catalyst Mgascomb is the mass throughput of effluents from the combustion zone K1 is the O2 content of the air, about 20% by volume K2 is the combustibility of the coke, i.e., the quantity of air necessary for combustion of a unit of coke that is generally between 12 and 15 Kg/Kg.

K3 is an empirical constant taking into account the air leaks in the combustion zone and is generally between 0.02 and 0.06.

Qlosses is the amount of heat dissipated by thermal losses outside the combustion zone and is generally between 5 and 15% of the heat of combustion (Mcata*Hreaction).

Tcatout is the catalyst temperature at the exit of the combustion zone.

Tcatin is the catalyst temperature at the entrance to the combustion zone.

Tgasin is the temperature of the gases at the entrance to the combustion zone.

Tgasout is the temperature of the gases at the exit of the combustion zone.

Cpgas is the specific heat of the gases and it is between 0.28 and 0.34 Kcal/Kg/° C.

Hreaction is the enthalpy of the heat of combustion and it is between 8500 Kcal/Kg and 11500 Kcal/Kg of coke, which can also be expressed as a function of the amount of O2 consumed by 100000 Kcal/kmole of O2 consumed.

Coke 5=coke determined in the laboratory based on a sample of catalyst taken from the unit according to the method of ASTM D 3178.

Certain modifications of the regeneration plan can slightly affect these various balances, but the philosophy of this invention is preserved in principle. In particular, the number of injection percentage points for air in the combustion zone, most often two (one at the bottom of the regenerator and the other between the two regeneration beds in most current units) could be increased, producing values supplemental to those of Air1 and Air2, and thus new evaluations of the coke based on partial oxygen balances (around each regeneration bed or a group of successive beds) or on overall balances (on the entire regeneration zone). These new values of the coke level would then be taken into account, and the consistency criteria defined below (designated as test CH on FIG. 1) would be applied to them:

If the difference among these various evaluations or measurements of the coke level is less than 0.5 percentage points, preferably less than 0.2 percentage points, and still more preferably less than 0.1 percentage points, the catalyst throughput will be adjusted by automatically indicating a new set percentage points for head loss which, depending on the mode selected, will be given by the following formulas, based on the following parameters:

Delta P (new value) called Delta P new
Delta P (preceding value) called Delta P old
Coke (new value) called coke new
Coke (preceding value) called coke old
Burning capacity called burning
Mass throughput of catalyst (preceding value) called M Cata old
Mass throughput of catalyst (new value) called M cata new.
Mode 1: Delta Pnew=(Delta Pold*coke old/coke new)
Mode 2: Delta Pnew=(Delta Pold*Burning2/Burning1)
The link between values Burning1 and Burning2 and the values of coke level, coke old and coke new is given by the following formula:

Burning1=coke old*$M$ cata old

Burning2=coke new*$M$ cata new.

If the difference between any two of these values of various estimates of the coke level is greater than 0.2 percentage points, preferably greater than 0.5 percentage points, while remaining less than 0.7 percentage points, there is an automatic switch to conventional mode (mode 3), i.e., the set percentage points of the head loss displayed manually is the last measured value of this head loss.

If the difference between any two of these values of the various estimates of the coke level is greater than 0.7 percentage points, and preferably greater than 1 percentage points, automatic stoppage of the circulation of the catalyst is triggered.

Mode 3: Delta Pnew—last measured value of Delta P and return to conventional control, i.e. manual.

These calculations are made automatically at the frequency at which the control system values are refreshed. However, the response time of the coke burning information that determines the thermal balance is on the order of several minutes, generally between 1 and 15 minutes and more usually between 5 and 10 minutes. Consequently, although the calculation is performed continuously, the consistency of the measurements around the regenerator is validated with a time constant on the order of at least 5 minutes, because of the limiting factor posed by the evaluation of the thermal balance. The lack of consistency of data on the coke level, limited to the evaluations performed based on various oxygen balances, can itself be detected more frequently, for example every 3 or 4 minutes.

The flowchart of FIG. 1 can be described as follows:

Assuming the beginning of an automatic control situation (test MC having given a negative response), the various coke balances from 1 to n are performed. The test on the limiting values (test LF) is performed. If one of the tested values goes beyond the imposed limits, for example if a temperature in the combustion zone is higher than its limiting value, an anomaly message is sent to the operator (message) and one returns to manual regulation mode. If the test on the limiting values is passed correctly, one proceeds to the test of the consistency of the coke values (test CH). If this test is negative and its result not serious, corresponding to a negative response to the test Ecart [difference]>X (X corresponds, for example, to a value of 1 percentage points on the differences between the various estimates of the coke level), an anomaly message is sent to the operator and one returns to manual regulation mode. If the consistency test (test CH) is negative, and its result serious, corresponding to a positive response to the test Ecart [difference]>X, the stopping of the circulating catalyst is automatically triggered. If the consistency test on the coke values is positive, i.e., if the difference between the various values of the coke level is less than the maximum retained value (for example, 0.2 percentage points), an automatic operating mode is selected (mode 1 or mode 2) and the set percentage points of delta P (delta P new) is determined based on values of the coke level and of the preceding value of delta P (delta P old), the term "preceding" to be understood in the sense of the succession, over time, of various values determined for delta P. The value of delta P new will be translated by an increment in the throughput of the catalyst, making it possible to meet the target of the selected mode. The flowchart thus described is automatically run through at the selected refresh frequency, i.e., every 15 minutes, preferably every 10 minutes, and still more preferably every 5 minutes.

The following examples illustrate the invention.

FIRST EXAMPLE

The goal of this first illustrative example is to show concretely how the principle of lift control developed in this invention functions. It details the way in which data concerning the level of coke on the catalyst are obtained, the processing of this data, and the determination of the new set points for delta P that will make it possible to regulate lift operation. The unit in question is a regenerative reforming unit that processes a throughput of a naphtha load of 100 T/h at a reaction temperature of 500° C. (head temperature of each of the reactors of the reaction zone, which is between 180° C. and 520° C.) and at an operating pressure of 3 bars. The catalyst is a bimetallic catalyst combining tin with platinum with the commercial name of CR 401, sold by the AXENS company in Rueil-Malmaison (France). The throughput of the circulating catalyst in the unit is an average of 500 Kg/h.

The two examples provided will make it possible to illustrate the operation in the constant burning capacity mode (mode 1) and in the constant coke level mode (mode 2).

In the first case (mode 1), there is a current situation summarized by the following values of the various parameters:

| | |
|---|---|
| Coke level | 5% |
| Delta P lift | 150 grams/cm$^2$ |
| Catalyst throughput | 500 Kg/h. |

It is desired to maintain the burning capacity at the value of 500 Kg/h*0.05=25 Kg/h of coke.

The calculation of the various coke levels, calculated at instant t, gave the following values:

Coke 1=5.2%

Coke 2=5.4%

Coke 3=5.6%

Coke 4=5.4%.

The consistency threshold, i.e., the maximum permissible difference between the various estimates of the coke level, is fixed at 0.5 percentage point. The maximum difference between these various values is 0.4 percentage point, and being less than 0.5 percentage points, the average value of the coke level can be deduced, and it is 5.4% (obtained by arithmetic average of the various coke values 1, 2, 3, 4). A weighted average could be used if it were desired to give more weight to this or that piece of data about the coke, which does not at all change the course of the protocol of determining the new delta P set percentage points. The current operating conditions of the unit (quality of the load and/or severity of operation) thus lead to an increase in the deposit of coke on the catalyst. So as to operate in iso burning capacity, i.e., 25 Kg/h of coke, the new set point value of delta P will thus be 150*(5/5,4)=139 grams, corresponding to a new value for the catalyst throughput of 463 Kg/h. It is in effect verified that the product 463 Kg/h*0.054=25 Kg/h properly maintains constant burning capacity.

In the second case (mode 2), there is a situation summarized by the following values of various parameters:

| | |
|---|---|
| Delta P lift: | 150 grams/cm² |
| Catalyst throughput: | 500 kg/h |
| Burning capacity: | 25 kg/h |

It is desired to maintain the coke level at 5%.

The calculation of the various coke levels, calculated at instant t, gave the following values:

Coke 1=6.2%.
Coke 2=6.0%
Coke 3=5.8%
Coke 4=6.0%.

The consistency threshold of the various estimates of the coke level is fixed at 0.5 percentage point. The maximum difference is between Coke 1: 6.2%, and Coke 3: 5.8% providing a difference of 4 tenths of a percentage point. The difference between the various calculations being less than 0.5 percentage points, an average value of the coke level can be deduced and it is 6% (obtained by arithmetic average of the values of coke 1; coke 2; coke 3; coke 4). The actual operating conditions of the unit (load quality and/or severity of operation) thus lead to an increase of 1% in the deposit of coke on the catalyst. So as to function with a constant level of coke on the catalyst (mode 2), the burning capacity of the regenerator will have to be increased by 5 kg/h (i.e., 500 Kg/h*0.01), or raised to 30 kg/h. The new set point value of delta P will thus be 150*(30/25)=180 g. This new value of delta P will be achieved, for example, by a series of increments of 1 gram every minute.

From an economic view point, this anticipation of deviation in the level of coke on the catalyst will lead to a productivity gain of about 0.15 percentage points in C5+ yields and thus, for a unit of 100 t/h, to an annual difference in C5+ of 1200 t/year, or a gain of about 216 k$_e$/year (based on 0.18 €/kg of C5+).

SECOND EXAMPLE

This second example is intended to illustrate the improvement in the operating safety of the unit.

Under constant regenerator operating conditions, if the level of coke on the catalyst increases, the position of the flame front in the second combustion bed shifts downward.

FIGS. (4) and (5) below show the position of this flame front, which is diagramed by a line slanting toward the bottom, since movement is in the direction of the combustion gas (designated G on FIGS. 4 and 5), i.e., from the outside toward the center of the regeneration zone (this incline is due to the fluidity of the catalyst, which is flowing slowly downward). During the combustion reaction, this front shifts downward, and at the end of combustion, it is thus located at a certain distance from the geometric end of the combustion zone. Under operating conditions of the unit that are close to the maximum capacity of the regenerator, the limit of the end of combustion can be surpassed and then the actual, intrinsic safety stops the circulation of the catalyst because of high temperature and consequently stops the regeneration of the catalyst. This operation near to the maximum limit of the regenerator leads to a significant loss of time because it is then necessary to restart the regeneration section, and it is accompanied for at least some time by a poor quality of regeneration of the catalyst entering the reactive section, the latter not having undergone complete regeneration. This type of unit operation thus leads to operating the unit with a higher average level of coke and thus to having lower yields or more severe operating conditions (for example, higher reaction temperature) to maintain the performance of the unit. It is thus easily conceivable that a system making it possible to have a more stable position of the flame front (mode 1) or controlled inside a safety perimeter (mode 2) would be a solution offering not only an important safety aspect but also guaranteeing an optimized operation of the reactive section because the regenerator is precluded from stopping, thus operating at an overall lower level of coke, which offers a non-negligible economic benefit.

Figure 4:
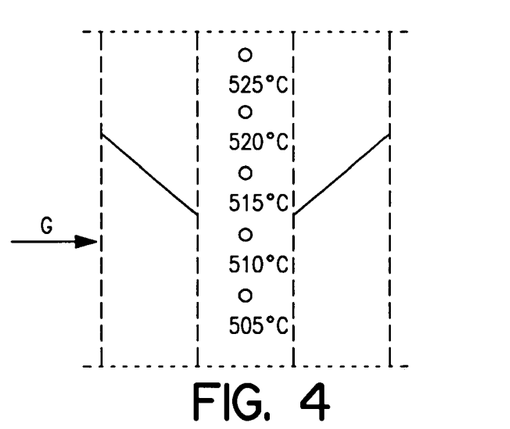
FIG. 4 illustrates a particular case of a temperature profile in the combustion zone.
Figure 5:
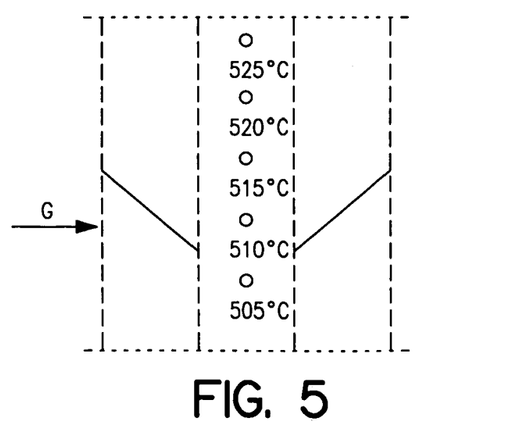
FIG. 5 represents another temperature profile in the combustion zone.

FIG. (4) according to the invention and (5) according to the prior art represent the position of the flame front at the end of the combustion cycle. The temperatures are measured using a series of thermocouples placed along a longitudinal axis of the combustion zone. It is confirmed that, at the end of cycle in FIG. (4) according to the invention, the flame front is located clearly inside the combustion zone and consequently is at clearly higher temperatures, while in FIG. (5) it is located much closer to the exit of this same zone.

To reiterate, the present invention has two different aims. The first one is to keep a variable, characteristic of the proper functioning of the regeneration zone, practically constant (amount of coke on the catalyst (coke level) or burning capacity for the regenerator).

The second one is to anticipate any shift of the conditions of the operation of the combustion zone. For instance, that is achieved according to the first example by keeping consistent between them some estimated values of said coke level. The coke level is estimated from different measurements (referred as coke 1, coke 2 etc. in the text), such as for instance the O2 and the thermal balances. All the measurements are conducted at substantially the same time are not necessarily at various parts of the bed. For example, referring to the same part of the bed, one measurement may be based on the O2 balance and an other on the thermal balances, provided that each of them gives an estimated value of the coke level on the catalyst for instance at the entrance to the regeneration zone. The values are then compared.

According to the invention, if all the values are consistent between any two of them, e.g. if they remain in a given shift, the circulation of the catalyst will be automatically corrected so that to approach the set percentage point value, said correction being based upon a deduced average value of the coke level (see the first example). On the contrary, if at least one value doesn't remain consistent in the given shift, the operator will be alerted.

The invention claimed is:

1. A process for controlling the combustion zone of a moving bed process comprising a regeneration zone and a reaction zone, the catalyst circulating between these two zones, and the regeneration zone comprising at least one stage for combustion of the coke deposited on the catalyst in the reaction zone, said process comprising automatically adjusting a varying catalyst throughput in the combustion zone directly or indirectly in response to a characteristic variable of the operation of said combustion zone, wherein the value of the varying catalyst throughput or of any command variable connected with the catalyst throughput is determined based on data about the operating values of the combustion zone, at least one of which corresponds to an evaluation of the level of coke deposited on the catalyst.

2. A process according to claim 1, wherein the data on the operating values of the combustion zone contain at least four independent evaluations of the level of coke deposited on the catalyst.

3. A process according to claim 1, wherein the characteristic variable of the operation of the combustion zone is the level of coke deposited on the catalyst at the entrance to the combustion zone.

4. A process according to claim 1, wherein the characteristic variable of the operation of the combustion zone is the burning capacity which is the product of the throughput of the circulating catalyst times the level of coke deposited on the catalyst at the entrance to the combustion zone.

5. A process according to claim 4, wherein evaluations of the level of coke deposited on the catalyst are compared among themselves so that if the difference between all these values, taken two by two, is less than 0.5 point, automatic control of the combustion zone is performed based on a setpoint determined using the average value of the various values of the coke level.

6. A process according to claim 1, wherein evaluations of the level of coke deposited on the catalyst are compared among themselves so that if the difference between any two of these values is greater than 0.2 point, control mode of the combustion zone is switched automatically to manual regulation mode.

7. A process according to claim 1, wherein evaluations of the level of coke deposited on the catalyst are compared among themselves so that if the difference between any two of these values is greater than 0.7 point, a automatic stoppage of catalyst circulation is triggered.

8. A process according to claim 1, wherein evaluations of the level of coke deposited on the catalyst are obtained by at least 3 independent balances performed on oxygen at various points of the combustion zone, and by at least one thermal balance performed on the entire combustion zone.

9. A process according to claim 1, wherein one of the evaluations of the level of coke deposited on the catalyst is obtained by a direct measurement performed according to ASTM D standard 3178, based on taking a sample of the circulating catalyst, taken just upstream from the regeneration zone.

10. A process according to claim 1, wherein automatic control of the combustion zone is performed so as to maintain the level of coke deposited on the catalyst at an approximately constant value, at its setpoint value plus or minus 0.5 point.

11. A process according to claim 1, wherein automatic control of the combustion zone is performed so as to maintain the product of the catalyst throughput times the level of coke burning capacity, at an approximately constant value, at its setpoint value plus or minus 5 Kg/h.

12. A process according to claim 1, wherein the successive setpoint values of the coke level or of the burning capacity are refreshed every 15 minutes.

13. A process according to claim 1 conducted in a process of continuous catalytic regeneration reforming of hydrocarbons, providing aromatics and/or hydrocarbons with a high octane number.

14. A process according to claim 1 conducted in a process of metathesis by moving bed, in the production of iso-paraffins based on n-paraffins, or in processes of dehydrogenation of paraffins made of cyclic compounds.

15. A process according to claim 5, wherein the difference is less than 0.2 point.

16. A process according to claim 5, wherein the difference is less than 0.1 point.

17. A process according to claim 6, wherein the difference is greater than 0.5 point up to 0.7 point.

18. A process according to claim 7, wherein the difference is greater than 1 point.

19. A process according to claim 10, wherein the substantially constant value is at its setpoint plus or minus 0.2 point.

20. A process according to claim 1, wherein the approximately constant value is at its setpoint plus or minus 2 Kg/hr.

21. A process according to claim 12, wherein the successive setpoint values are refreshed every 10 minutes.

22. A process according to claim 12, wherein the successive setpoint values are refreshed every 5 minutes.

23. A process for controlling the combustion zone of a moving bed process comprising a regeneration zone and a reaction zone, the catalyst circulating between these two zones, and the regeneration zone comprising at least one stage for combustion of the coke deposited on the catalyst in the reaction zone, said process comprising evaluating the level of coke deposited on the catalyst and in response to said level adjusting catalyst throughput in the combustion zone and said evaluating providing at least two independent evaluations of the level of coke deposited on the catalyst at substantially the same time, and comparing said estimates and if the estimates are consistent, the process is subjected to automatic control, but if inconsistent, the process is subjected to manual control.

* * * * *